(12) United States Patent
Cho et al.

(10) Patent No.: US 10,319,217 B2
(45) Date of Patent: *Jun. 11, 2019

(54) METHOD FOR CONTROLLING VIDEO SYSTEM INCLUDING A PLURALITY OF DISPLAY APPARATUSES

(71) Applicant: Samsung Electronics Co., Ltd., Gyeonggi-do (KR)

(72) Inventors: Hyung-rae Cho, Seoul (KR); Hyun-joo Oh, Seoul (KR); Sun-ae Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 232 days.

This patent is subject to a terminal disclaimer.

(21) Appl. No.: 14/530,252

(22) Filed: Oct. 31, 2014

(65) Prior Publication Data

US 2015/0058888 A1  Feb. 26, 2015

Related U.S. Application Data

(63) Continuation of application No. 13/026,853, filed on Feb. 14, 2011, now Pat. No. 8,904,433.

(30) Foreign Application Priority Data

Feb. 12, 2010  (KR) .................. 10-2010-0013592

(51) Int. Cl.
*H04N 21/41* (2011.01)
*H04N 21/4143* (2011.01)
(Continued)

(52) U.S. Cl.
CPC ........ *G08C 17/02* (2013.01); *H04M 1/72533* (2013.01); *H04N 5/4403* (2013.01);
(Continued)

(58) Field of Classification Search
CPC .................................................. H04N 21/4122
(Continued)

(56) References Cited

U.S. PATENT DOCUMENTS

2001/0055951 A1* 12/2001 Slotznick .............. H04M 1/215
                                                              455/41.3
2002/0193073 A1  12/2002 Fujioka
(Continued)

FOREIGN PATENT DOCUMENTS

EP  1507361  2/2005
GB  2454219  5/2009
(Continued)

OTHER PUBLICATIONS

Korean Office Action dated Nov. 18, 2015 issued in counterpart application No. 10-2010-0013592, 8 pages.

*Primary Examiner* — Jeffrey F Harold
*Assistant Examiner* — Justin B Sanders
(74) *Attorney, Agent, or Firm* — The Farrell Law Firm, P.C.

(57) ABSTRACT

A method for controlling a video system wherein the nearest display apparatus is selected by detecting a distance to each of a plurality of display apparatuses and information regarding the nearest display apparatus is transmitted to another video apparatus allowing a user apparatus to select the nearest display apparatus without additional input.

14 Claims, 12 Drawing Sheets

(51) Int. Cl.
*G08C 17/02* (2006.01)
*H04M 1/725* (2006.01)
*H04N 21/422* (2011.01)
*H04N 21/436* (2011.01)
*H04N 21/442* (2011.01)
*H04N 21/485* (2011.01)
*H04N 5/44* (2011.01)

(52) U.S. Cl.
CPC ..... *H04N 21/4122* (2013.01); *H04N 21/4126* (2013.01); *H04N 21/4222* (2013.01); *H04N 21/42222* (2013.01); *H04N 21/43615* (2013.01); *H04N 21/44222* (2013.01); *H04N 21/485* (2013.01); *G08C 2201/70* (2013.01); *G08C 2201/91* (2013.01); *G08C 2201/93* (2013.01); *H04N 2005/4423* (2013.01); *H04N 2005/4426* (2013.01)

(58) Field of Classification Search
USPC .......................................................... 348/789
See application file for complete search history.

(56) References Cited

U.S. PATENT DOCUMENTS

| | | | |
|---|---|---|---|
| 2006/0194589 A1* | 8/2006 | Sankisa | H04W 4/023 455/456.1 |
| 2007/0298815 A1* | 12/2007 | Yamashita | A63F 13/12 455/456.1 |
| 2008/0155591 A1* | 6/2008 | Mahajan | G06Q 30/02 725/34 |
| 2008/0207296 A1* | 8/2008 | Lutnick | G07F 17/32 463/16 |
| 2008/0273079 A1 | 11/2008 | Campbell et al. | |
| 2008/0318547 A1 | 12/2008 | Ballou et al. | |
| 2009/0019394 A1 | 1/2009 | Sekimoto et al. | |
| 2009/0132923 A1* | 5/2009 | Han | H04L 12/282 715/717 |
| 2009/0164600 A1 | 6/2009 | Issa et al. | |
| 2009/0270093 A1* | 10/2009 | Lee | H04M 1/7253 455/434 |
| 2010/0007458 A1 | 1/2010 | Cannistraro et al. | |
| 2010/0156627 A1 | 6/2010 | Kennedy | |
| 2010/0188695 A1* | 7/2010 | Okigami | H04M 1/7253 358/1.15 |
| 2011/0012743 A1* | 1/2011 | Van Gorp | G08C 17/02 340/686.6 |

FOREIGN PATENT DOCUMENTS

| | | |
|---|---|---|
| JP | 2005-175862 | 6/2005 |
| JP | 2006-319680 | 11/2006 |
| JP | 2007-074056 | 3/2007 |
| KR | 1020090059651 | 6/2009 |
| KR | 1020090075376 | 7/2009 |

* cited by examiner

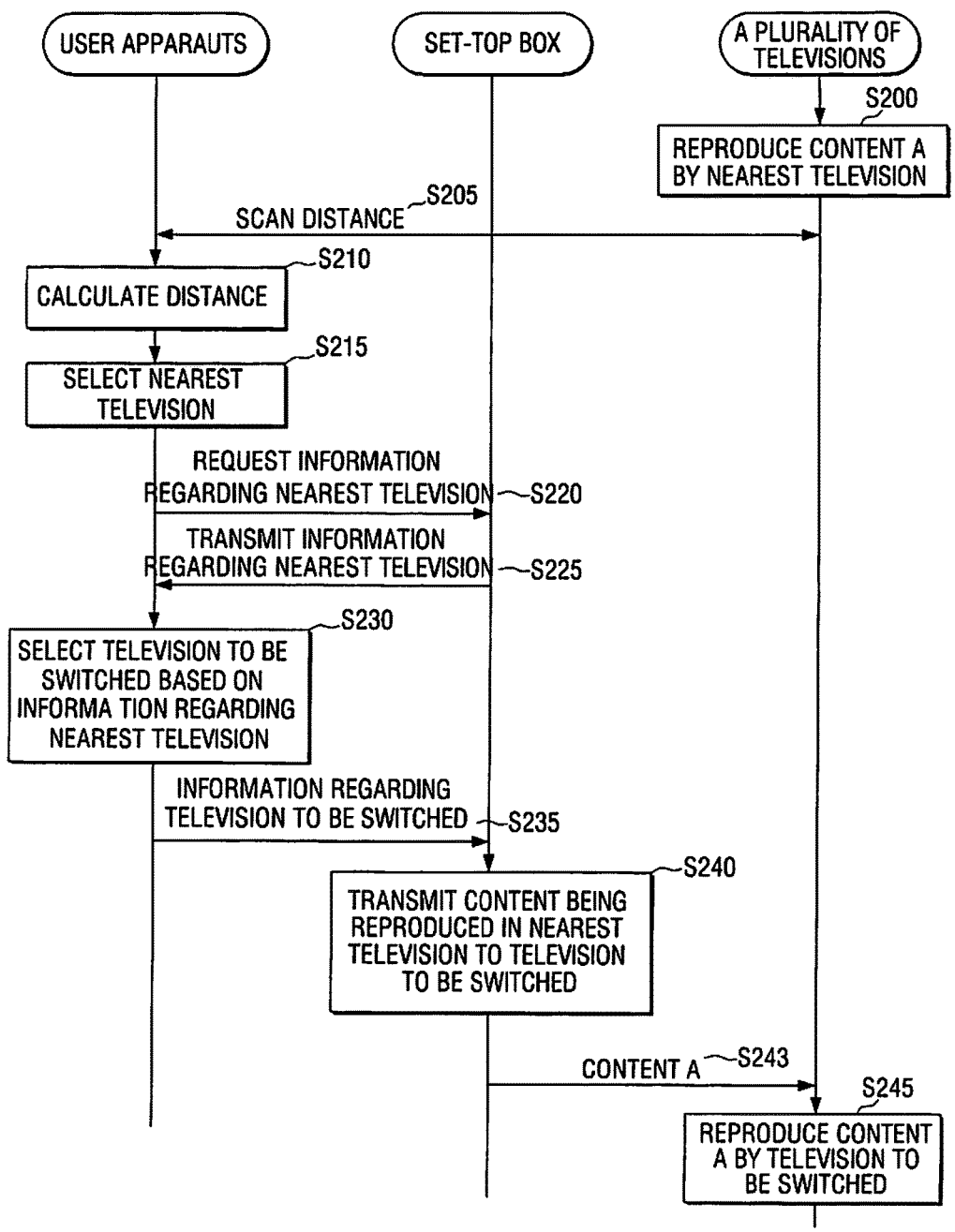

METHOD FOR CONTROLLING VIDEO SYSTEM INCLUDING A PLURALITY OF DISPLAY APPARATUSES

PRIORITY

This application is a continuation of U.S. Ser. No. 13/026,853, which was filed in the U.S. Patent and Trademark Office on Feb. 14, 2011, and claims priority under 35 U.S.C. § 119(a) to Korean Patent Application No. 2010-0013592, which was filed in the Korean Intellectual Property Office on Feb. 12, 2010, the entire disclosure of each of which is incorporated herein by reference.

BACKGROUND OF THE INVENTION

1. Field of the Invention

The present invention relates generally to a method for controlling a video system, and more particularly, to a method for controlling a video system including a plurality of display apparatuses.

2. Description of the Related Art

Recently, with the development of mobile device technologies, mobile devices have become capable of providing various functions, including communicating with other apparatuses which allows mobile devices to be operated in association with other various apparatuses. For example, a mobile device may provide various functions as being communicably connected to a television.

In addition, a mobile device may be connected to a plurality of televisions and control the plurality of televisions. Therefore, various functions are possible using a mobile device and a television together.

However, selecting a television to be controlled from among a plurality of televisions can be a complicated process. For example, in order to select a desired television using a mobile device, a user should display a list of a plurality of televisions on a screen, check information of each television, and select a desired television, which is not a convenient way for a user to select a desired television using a mobile device. Therefore, a method for allowing the user to select a television using a mobile device conveniently is required.

SUMMARY OF THE INVENTION

The present invention has been made to address at least the above problems and/or disadvantages and to provide at least the advantages described below.

Accordingly, an aspect of the present invention provides a method for controlling a video system by detecting a distance of a plurality of display apparatuses, selecting a nearest display apparatus, and transmitting information regarding the nearest display apparatus to another video apparatus.

According to an aspect of the present invention, a method is provided for controlling a video system in a user apparatus communicable with a video system including a video apparatus communicably connected to a plurality of display apparatuses. The method includes detecting a distance to each of the plurality of display apparatuses, selecting a first display apparatus which is located in the nearest position from among the plurality of display apparatuses, selecting a second display apparatus from among the plurality of display apparatuses, and transmitting information regarding the first display apparatus and information regarding the second display apparatus to the video apparatus.

The method may further include requesting the video apparatus to send reference information regarding the first display apparatus and receiving the reference information from the video apparatus in response to the request, and the selecting the second display apparatus may include selecting the second display apparatus from among the plurality of display apparatuses based on the reference information.

The method may further include reproducing content being reproduced in the first display apparatus at the second display apparatus using information regarding the first display apparatus.

The method may further include changing a broadcast channel of the second display apparatus to a broadcast channel of the first display apparatus at the second display apparatus using information regarding the first display apparatus.

As described above, according to the various embodiments of the present invention, a method for controlling a video system in which the nearest display apparatus is selected by detecting a distance to each of a plurality of display apparatuses and information regarding the nearest display apparatus is transmitted to another video apparatus is provided. Accordingly, a user apparatus may select the nearest display apparatus without entering additional input.

In addition, as content being reproduced in the nearest display apparatus is displayed in another display apparatus, a user may reproduce the content being reproduced in the nearest display apparatus in another display apparatus and watch another content using the nearest display apparatus.

BRIEF DESCRIPTION OF THE DRAWINGS

The above and/or other aspects, features and advantages of the present invention will be more apparent from the following detailed description when taken in conjunction with the accompanying drawings, in which:

FIG. 2A is a flowchart illustrating a method for controlling a video system where a television to be switched is automatically selected according to an embodiment of the present invention;

DETAILED DESCRIPTION OF EMBODIMENTS OF THE PRESENT INVENTION

Figure 1:
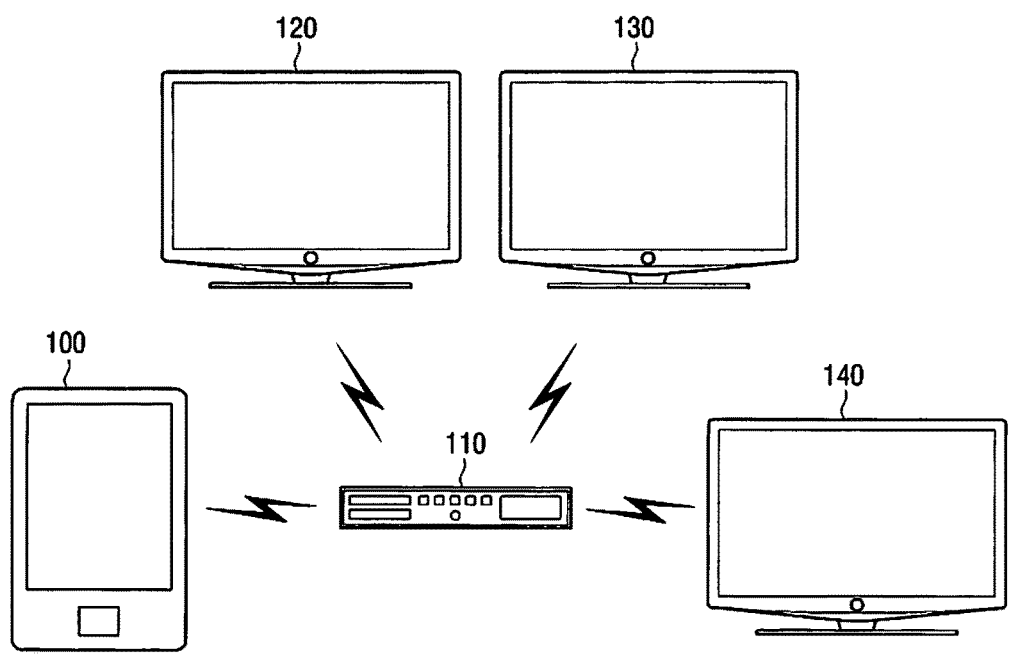
FIG. 1 is a diagram illustrating a video system according to an embodiment of the present invention.

Certain embodiments of the present invention are described in more detail below with reference to the accompanying drawings.

In the following description, similar reference numerals are used for similar elements, throughout the drawings. The matters defined in the description, such as detailed construction and elements, are provided to assist in a comprehensive understanding of the embodiments of the present invention. However, the present invention can be practiced without those specifically defined matters. Also, well-known functions or constructions are not described in detail since they would obscure the present invention with unnecessary detail.

FIG. 1 is a diagram illustrating a video system according to an embodiment of the present invention. As illustrated in FIG. 1, a video system comprises a user apparatus 100, a set-top box 110, and a plurality of televisions 120, 130, 140.

The user apparatus 100 is an apparatus that is carried and used by a user, but is not limited to a mobile device. That is, the user apparatus 100 may be any apparatus capable of controlling a video system. For example, the user apparatus 100 may be a cellular phone, a media planner, a mobile content reproducing apparatus (an MP3 player, a PMP, and so forth), a PDA, a mobile computer, and a remote controller.

The user apparatus 100 is communicably connected to the set-top box 110. In addition, the user apparatus 100 may also be communicably connected to the plurality of televisions 120, 130, 140. The user apparatus 100 may be connected to the set-top box 110 and the plurality of televisions 120, 130, 140 through a mobile communication network, a Bluetooth® connection, or a wireless LAN.

The user apparatus 100 detects the distance to each of the plurality of televisions 120, 130, 140. Specifically, if a specific input entered by a user, the user apparatus 100 detects the distance to each of the plurality of televisions 120, 130, 140. Herein, the specific input represents an input to switch functions between televisions. That is, the user apparatus 100 controls to reproduce content of the nearest television on another television.

The user apparatus 100 detects the distance to each of the plurality of televisions 120, 130, 140 using various methods. The user apparatus 100 may detect the distance using strength of an RF signal, Received Signal Strength Indication (RSSI), or Chirp Spread Spectrum (CSS). The RF signal may be various local communication signals such as WIFI (wireless LAN), Bluetooth®, and Zigbee. The distance may be detected using various methods in addition to the method of using strength of an RF signal.

The user apparatus 100 broadcasts a signal for detecting a distance to the plurality of televisions 120, 130, 140 when detecting the distance and receives a signal from the plurality of televisions 120, 130, 140 in response to the distance detection signal. The response signal includes distance information and apparatus information regarding each television. Specifically, information regarding a television is included in a header of the response signal packet. Accordingly, the user apparatus 100 may recognize a location of each television.

The user apparatus 100 selects a television which is located in the nearest position (hereinafter, the nearest television) using detected distance information.

The user apparatus 100 selects a television to be switched from among the plurality of televisions 120, 130, 140. Herein, the television to be switched represents a television of which content being reproduced is switched to content of the nearest television.

The user apparatus 100 may set a list of candidates for a television to be switched in various ways. For example, the user apparatus 100 may select a television to be switched from a pre-registered television list. Alternatively, the user apparatus 100 may select a television to be switched from among televisions which transmit a response signal to a distance measurement signal.

The user apparatus may select a television to be switched automatically. The user apparatus 100 requests the set-top box 110 to send reference information regarding the nearest television. In response, the user apparatus 100 receives the reference information regarding the nearest television from the set-top box 110. The user apparatus 100 selects a television to be switched from among the plurality of televisions 120, 130, 140 based on the reference information. Specifically, a user is registered in each of the plurality of televisions 120, 130, 140. Accordingly, the user apparatus 100 compares reference information with user information, selects a suitable user from among users of the plurality of televisions 120, 130, 140, and selects a television of the selected user as a television to be switched.

Herein, the reference information represents information based on which the nearest television is selected automatically. The reference information includes information regarding content being reproduced in the nearest television or history information regarding the nearest television.

The information regarding content being reproduced in the nearest television represents information based on which a suitable user is selected. Specifically, the information regarding content being reproduced in the nearest television includes information regarding an age of the viewers and genre of the content (such as, sport, drama, cartoons, education, and so forth).

For example, suppose that the age of a user registered in a first TV 120 is 7, the age of a user registered in a second TV 130 is 20, and the age of a user registered in a third TV 140 is 50. According to reference information, if the age of viewers of content being reproduced in the nearest television is 7 and the genre of the content is cartoons, the user apparatus 100 selects the first TV 120 as a television to be switched based on the reference information.

The history information regarding the nearest television is information based on which a user who uses the nearest television for the last time is determined using usage history of users of the nearest television. Specifically, the history information includes details of connected user IDs, details of connections to a user apparatus, details of commands input to a user apparatus, a list of preferred content for each user, details of reserved programs, and details of recording commands.

Suppose that a user registered in the first TV 120 is user A, a user registered in the second TV 130 is user B, and a user registered in the third TV 140 is user C. If it is recorded in the details of connected IDs that user B is the last person connected to the nearest television, the user apparatus 100 selects the second TV 130 as a television to be switched since the last user of the nearest television is highly likely to be a person who is watching content being currently reproduced. Therefore, the user apparatus 100 determines the latest user of the nearest television using history information and selects a television in which the user is registered as a television to be switched.

As such, the user apparatus 100 selects a television to be switched using reference information.

The user apparatus 100 may select a television to be switched manually. The user apparatus 100 selects a television to be switched from among the plurality of televisions 120, 130, 140 according to a user selection. That is, if one television is selected from among the plurality of televisions 120, 130, 140 according to a user input, the user apparatus 100 selects the television selected by the user as a television to be switched.

Subsequently, the user apparatus 100 transmits a switch command, information regarding the nearest television, and information regarding a television to be switched to the set-top box 110. Herein, the information regarding the nearest television and the information regarding a television to be switched represent information to define the nearest television and a television to be switched and may include apparatus information, apparatus ID, and a serial number. Accordingly, the set-top box 110 may recognize which television is the nearest television and which television is a television to be switched from among the plurality of televisions 120, 130, 140 using the information regarding the nearest television and the information regarding a television to be switched.

The switch command represents a command to switch content being reproduced in a television to be switched with content being reproduced in the nearest television. Accordingly, if the switch command is received, the set-top box 110 performs the switching operation.

The set-top box 110 transmits content to the plurality of televisions 120, 130, 140. Specifically, the set-top box 120 controls content input to the plurality of televisions 120, 130, 140.

Specifically, the set-top box 110 controls a television to be switched so that content being reproduced in the nearest television is reproduced in the television to be switched using information regarding the nearest television and information regarding the television to be switched.

To do so, the set-top box 110 identifies the nearest television and a television to be switched from among the plurality of televisions 120, 130, 140 using information regarding the nearest television and information regarding the television to be switched. Subsequently, the set-top box 110 transmits content being reproduced in the nearest television to the television to be switched.

The set-top box 110 identifies a channel currently being selected in the nearest television using information regarding the nearest television and information regarding the television to be switched. The information regarding the nearest television includes channel information. The set-top box 110 switches a broadcast channel of the television to be switched with a broadcast channel of the nearest television.

As such, the set-top box 110 controls to reproduce content being reproduced in the nearest television in a television to be switched.

The plurality of televisions 120, 130, and 140 are controlled by the set-top box 110 and display content provided by the set-top box 110 respectively. In FIG. 1, the plurality of televisions 120, 130, 140 include the first TV 120, the second TV 130, and the third TV 140, but more televisions may be included in the plurality of televisions 120, 130, and 140. In addition, the plurality of televisions include the user apparatus 100, the nearest television, and a television of which content is to be switched.

As described above, a video providing system is controlled by the user apparatus 100. Specifically, content of the nearest television is reproduced in a television to be switched and thus, a user may reproduce content being reproduced in the nearest television in another television and watch another content using the nearest television.

Figure 2B:
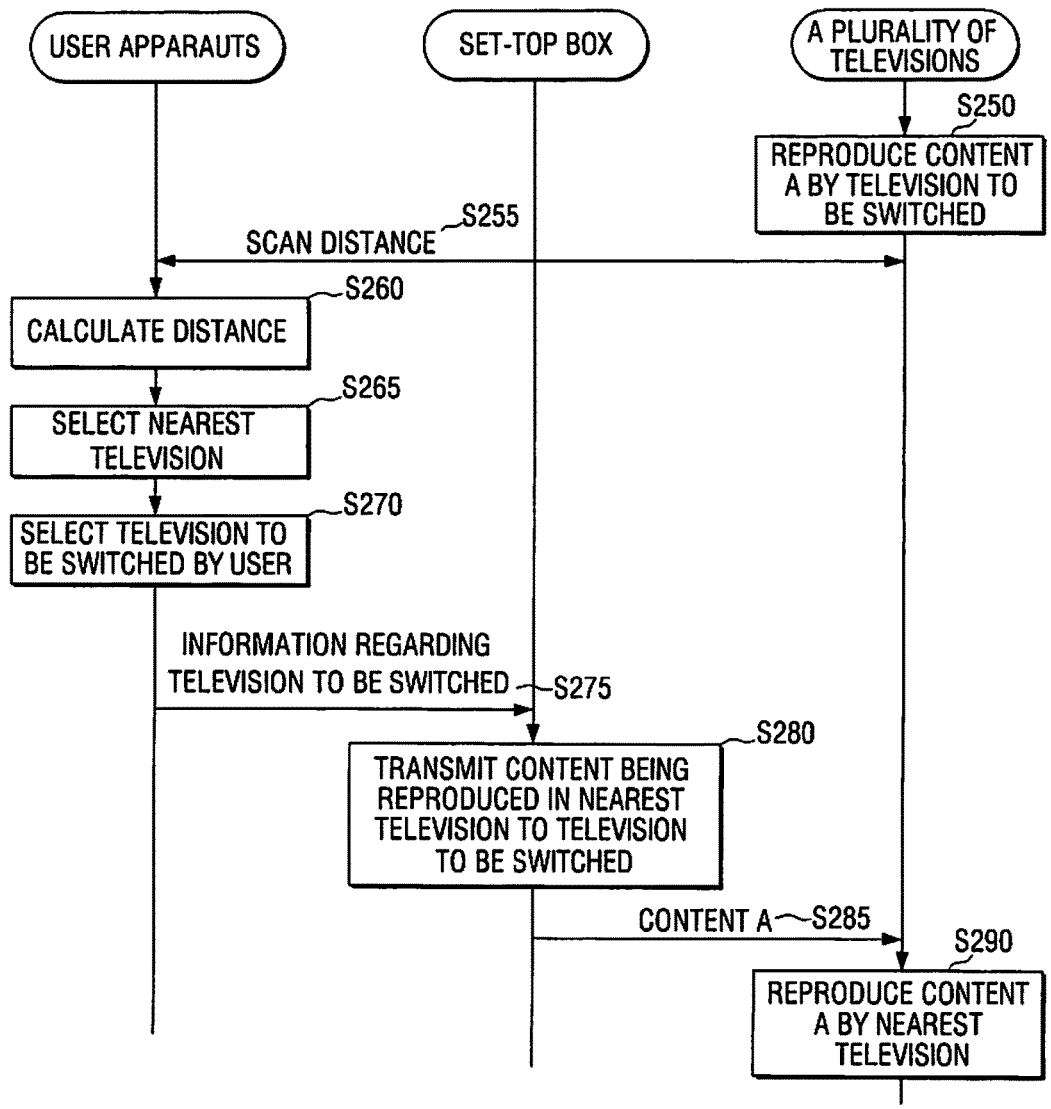
FIG. 2B is a flowchart illustrating a method for controlling a video system where a television to be switched is manually selected according to an embodiment of the present invention.

Hereinafter, a method for controlling a video system will be explained with reference to FIGS. 2A and 2B. FIG. 2A is a flowchart to explain a method for controlling a video system where a television to be switched is automatically selected according to an embodiment of the present invention.

As illustrated in FIG. 2A, the nearest television which is located in the nearest position from among a plurality of televisions is reproducing content A in Step S200. Herein, although a distance to each of the plurality of televisions is not measured yet, it should be noted that a television to be selected as the nearest television from among the plurality of televisions is currently reproducing content A in Step S200.

Subsequently, the user apparatus 100 scans the distance to each of the plurality of televisions in Step S205. The user apparatus 100 calculates the distance to each of the plurality of televisions using the scanning information in Step S210 and selects the nearest television which is located in the nearest position using the calculated distance information in Step S215.

The user apparatus 100 requests the set-top box 110 to send reference information regarding the selected nearest television in Step S220. Accordingly, the set-top box 110 transmits the reference information regarding the nearest television to the user apparatus 100 in Step S225.

The user apparatus 100 selects a television to be switched based on the received information regarding the nearest television in Step S230. Specifically, a user is registered in each of the plurality of televisions 120, 130, 140. Accordingly, the user apparatus 100 compares reference information with user information, selects a suitable user from among users of the plurality of televisions 120, 130, 140, and selects a television of the selected user as a television to be switched. Herein, the reference information represents information based on which the nearest television is selected automatically. The reference information includes information regarding content being reproduced in the nearest television or history information regarding the nearest television. The process of selecting a television to be switched by the user apparatus 100 and the reference information have been provided in detail with reference to FIG. 1.

Subsequently, the user apparatus 100 transmits information regarding the nearest television and information regarding a television to be switched in Step S235. Herein, the information regarding the nearest television and the information regarding a television to be switched represent information to define the nearest television and a television to be switched and may include apparatus information, apparatus ID, and a serial number. Accordingly, the set-top box 110 may recognize which television is the nearest television and which television is a television to be switched from among the plurality of televisions 120, 130, 140 using the information regarding the nearest television and the information regarding a television to be switched.

The set-top box 110 controls a television to be switched so that content being reproduced in the nearest television is reproduced in the television to be switched using information regarding the nearest television and information regarding the television to be switched. To do so, the set-top box 110 identifies the nearest television and a television to be switched from among the plurality of televisions 120, 130, 140 using information regarding the nearest television and information regarding the television to be switched. The set-top box 110 transmits content being reproduced in the nearest television to the television to be switched in Step S240.

Subsequently, the set-top box 110 transmits content A being reproduced in the nearest television to the television to be switched in Step S243, and the television to be switched reproduces content A in Step S245.

Alternatively, the set-top box 110 may allow the television to be switched to reproduce content of the nearest television by switching a broadcast channel of the television to be switched with a broadcast channel of the nearest television. Specifically, the set-top box 110 identifies a channel currently being selected in the nearest television using information regarding the nearest television and information regarding the television to be switched. The information regarding the nearest television includes channel information. Subsequently, the set-top box 110 switches a broadcast channel of the television to be switched with a broadcast channel of the nearest television.

As described above, the user apparatus 100 selects a television to be switched automatically using reference information without a user input, and the television to be switched reproduces content of the nearest television under the control of the user apparatus 100. Accordingly, a user may reproduce content being reproduced in the nearest television in another television and watch another content using the nearest television.

FIG. 2B is a flowchart to explain a method for controlling a video system where a television to be switched is manually selected according to an embodiment of the present invention.

As illustrated in FIG. 2A, the nearest television which is located in the nearest position from among a plurality of televisions is reproducing content A. Herein, although a distance to each of the plurality of televisions is not measured yet, it should be noted that a television to be selected as the nearest television from among the plurality of televisions is currently reproducing content A in Step S250.

Subsequently, the user apparatus 100 scans the distance to each of the plurality of televisions in Step S255. The user apparatus 100 calculates the distance to each of the plurality of televisions using the scanning information in Step S260 and selects the nearest television which is located in the nearest position using the calculated distance information in Step S265.

The user apparatus selects a television to be switched based on a user selection in Step S270. Specifically, the user apparatus 100 displays a list of the plurality of televisions 120, 130, 140 on the screen and selects a television selected by the user from the list as a television to be switched.

Subsequently, the user apparatus 100 transmits information regarding the nearest television and information regarding a television to be switched in Step S275. Herein, the information regarding the nearest television and the information regarding a television to be switched represent information to define the nearest television and a television to be switched and may include apparatus information, apparatus ID, and a serial number. Accordingly, the set-top box 110 may recognize which television is the nearest television and which television is a television to be switched from among the plurality of televisions 120, 130, 140 using the information regarding the nearest television and the information regarding a television to be switched.

The set-top box 110 controls a television to be switched so that content being reproduced in the nearest television is reproduced in the television to be switched using information regarding the nearest television and information regarding the television to be switched. To do so, the set-top box 110 identifies the nearest television and a television to be switched from among the plurality of televisions 120, 130, 140 using information regarding the nearest television and information regarding the television to be switched. The set-top box 110 transmits content being reproduced in the nearest television to the television to be switched in Step S280.

Subsequently, the set-top box 110 transmits content A being reproduced in the nearest television to the television to be switched in Step S285, and the television to be switched reproduces content A in Step S290.

Alternatively, the set-top box 110 may allow the television to be switched to reproduce content of the nearest television by switching a broadcast channel of the television to be switched with a broadcast channel of the nearest television. Specifically, the set-top box 110 identifies a channel currently being selected in the nearest television using information regarding the nearest television and information regarding the television to be switched. The information regarding the nearest television includes channel information. Subsequently, the set-top box 110 switches a broadcast channel of the television to be switched with a broadcast channel of the nearest television.

As described above, the user apparatus 100 selects a television to be switched manually according to a user selection. The television to be switched reproduces content of the nearest television under the control of the user apparatus 100. Accordingly, a user may reproduce content being reproduced in the nearest television in another television and watch another content using the nearest television.

Hereinafter, a process of controlling a video system using the user apparatus 100 will be explained in detail with reference to FIGS. 3A to 3I. FIGS. 3A to 3I are diagrams illustrating a process of controlling a video system using the user apparatus 100 according to an embodiment of the present invention.

Figure 3A:
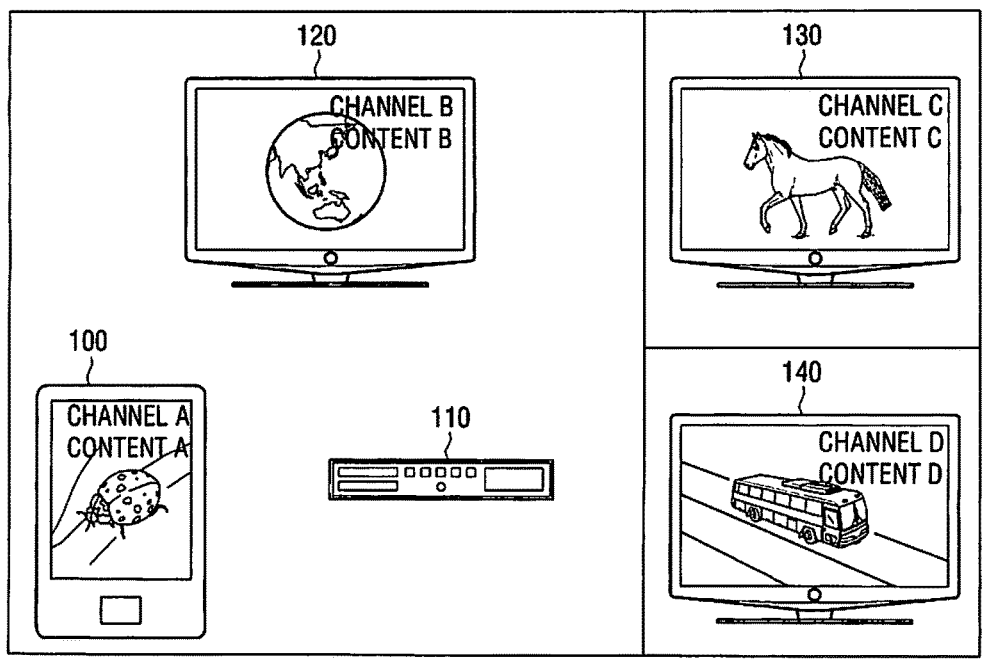
FIGS. 3A to 3I are diagrams illustrating a process of controlling a video system using a user apparatus 100 according to an embodiment of the present invention.

FIG. 3A is a diagram illustrating a video system including three televisions 120, 130, 140 and the set-top box 110 and the user apparatus 100 for controlling thereof. As illustrated in FIG. 3A, the user apparatus 100 is reproducing content A of channel A. In addition, it can be seen that the first TV 120 is reproducing content B of channel B, the second TV 130 is reproducing content C of channel C, and the third TV 140 is reproducing content D of channel D.

Figure 3B:
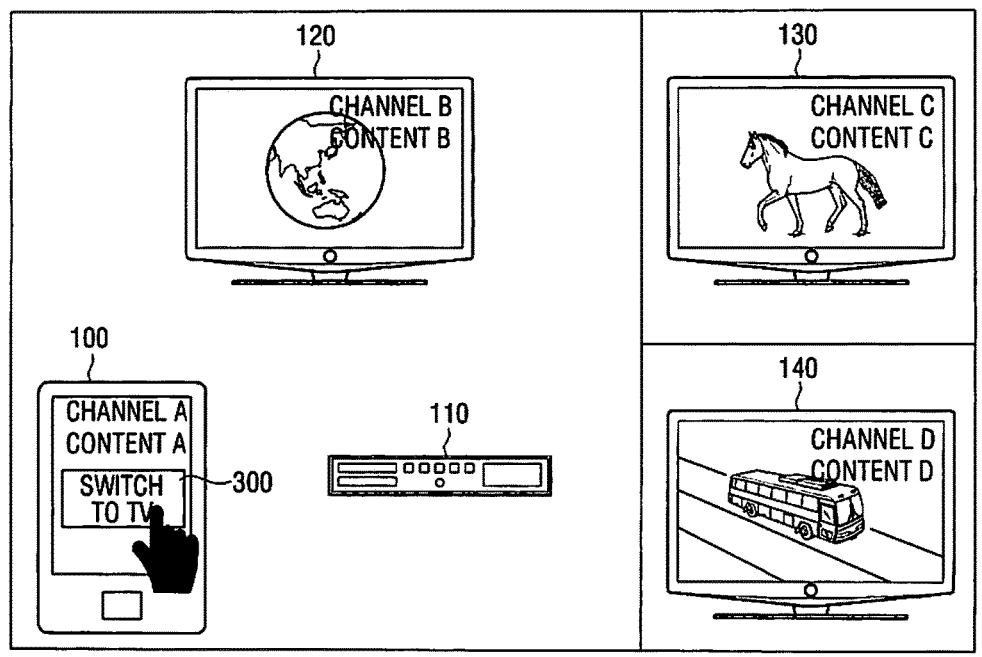

As illustrated in FIG. 3B, the user apparatus 100 may display a switch-to-TV function button 300 on the screen. Herein, the switch-to-TV function button 300 represents a button to receive a command to perform a function of reproducing a channel or content being reproduced in the user apparatus 100 in the nearest television.

Figure 3C:
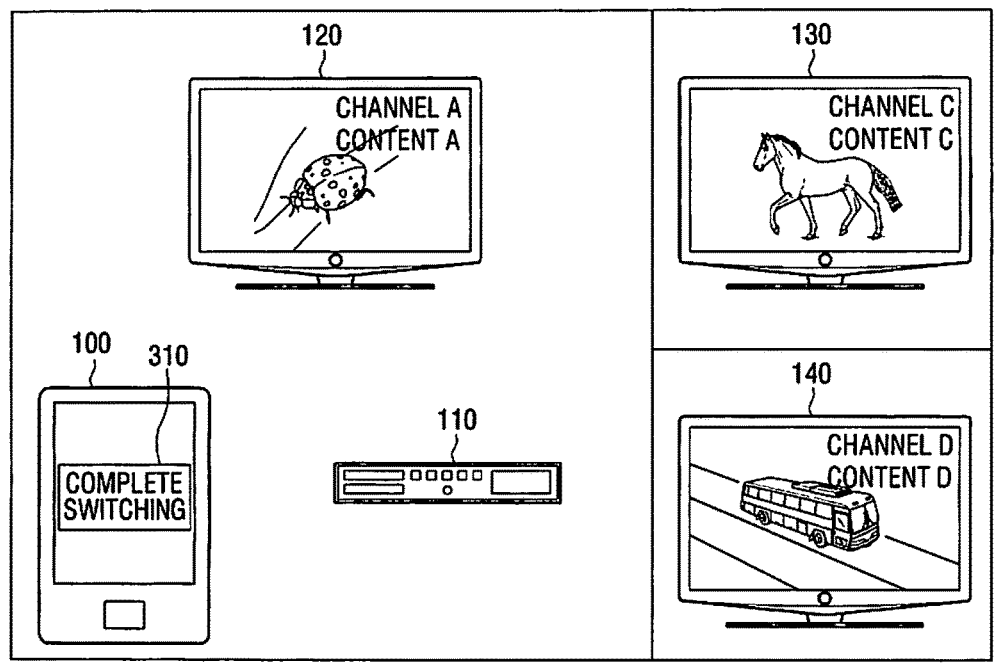

Accordingly, as illustrated in FIG. 3B, if the switch-to-TV function button 300 is selected, channel A or content A which is a channel or content being reproduced in the user apparatus 100 is reproduced in the first TV 120 as illustrated in FIG. 3C. That is, in FIG. 3C, a television nearest to the user apparatus 100 is the first TV 120, and a channel of the first TV 120 is changed from channel B to channel A by the user apparatus 100. Subsequently, a switch completion message 310 is displayed on the screen of the user apparatus 100.

As such, the user apparatus may control to reproduce a channel and content being reproduced in the user apparatus 100 in the nearest television. Accordingly, a user may watch content outside the home using the user apparatus and continue to watch the same content inside the home using the switch function.

Figure 3D:
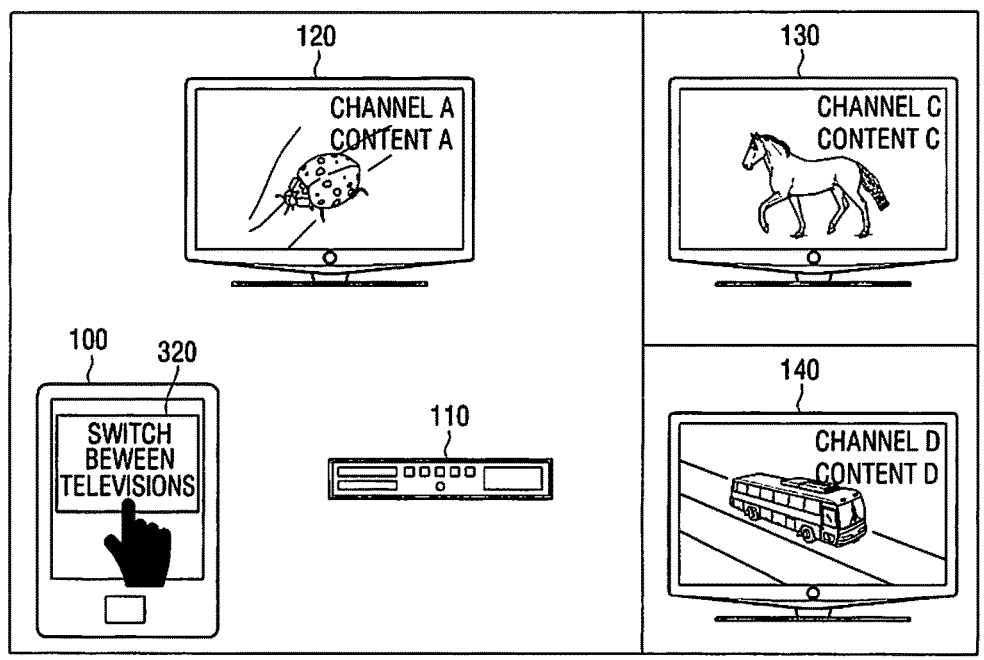

As illustrated in FIG. 3D, a user apparatus displays a switch-between-TV function button 320 on the screen. Herein, the switch-between-TV function 320 represents a button to receive a command to perform a function of controlling the user apparatus 100 so that content of the nearest television is reproduced in another television.

Figure 3E:
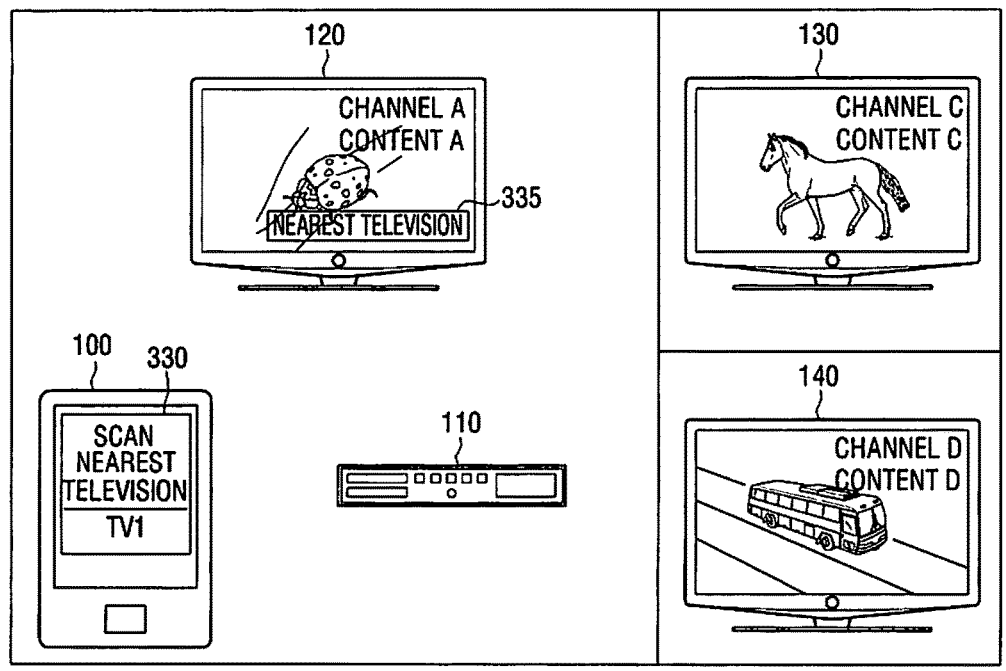

Accordingly, as illustrated in FIG. 3D, if the switch-between-TV function button 320 is selected, the user apparatus 100 scans the nearest television as illustrated in FIG. 3E. Referring to a scanning window for the nearest television 330 in FIG. 3E, it can be seen that the first TV 120 (that is, TV 1) is selected as the nearest television.

A nearest television icon 335 indicating that the nearest television is selected is displayed on the screen of the first TV 120. Accordingly, a user may easily identify which television is the nearest television.

Figure 3F:
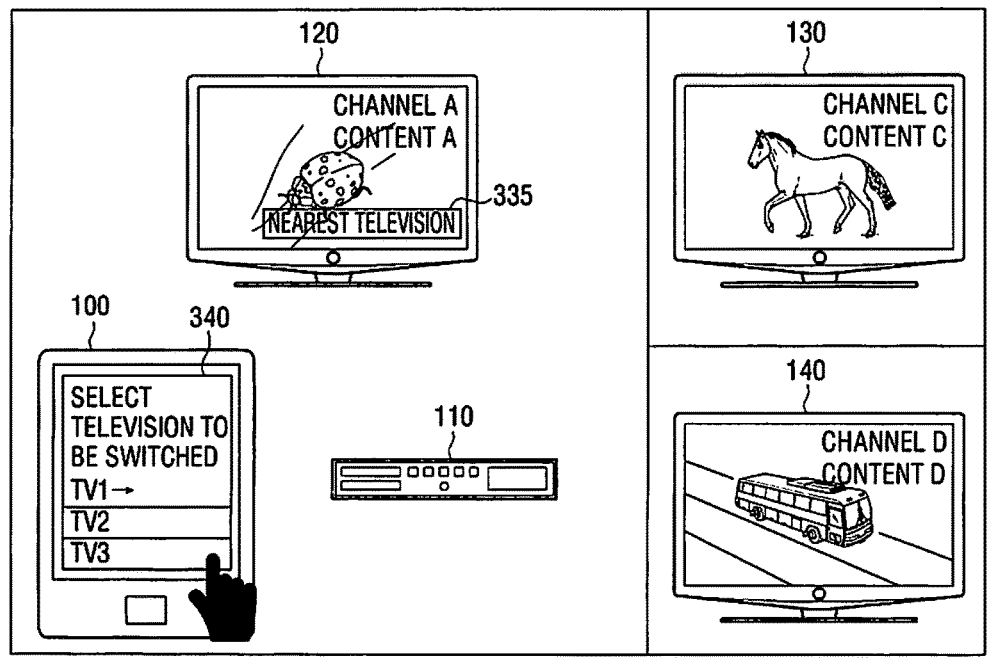

Subsequently, as illustrated in FIG. 3F, the user apparatus 100 displays a window for selecting a television to be switched 340 on the screen. A user may select a desired television as a television to be switched using the window for selecting a television to be switched 340.

However, the process of FIG. 3F is not performed if the user apparatus 100 is set to select a television to be switched automatically.

Figure 3G:
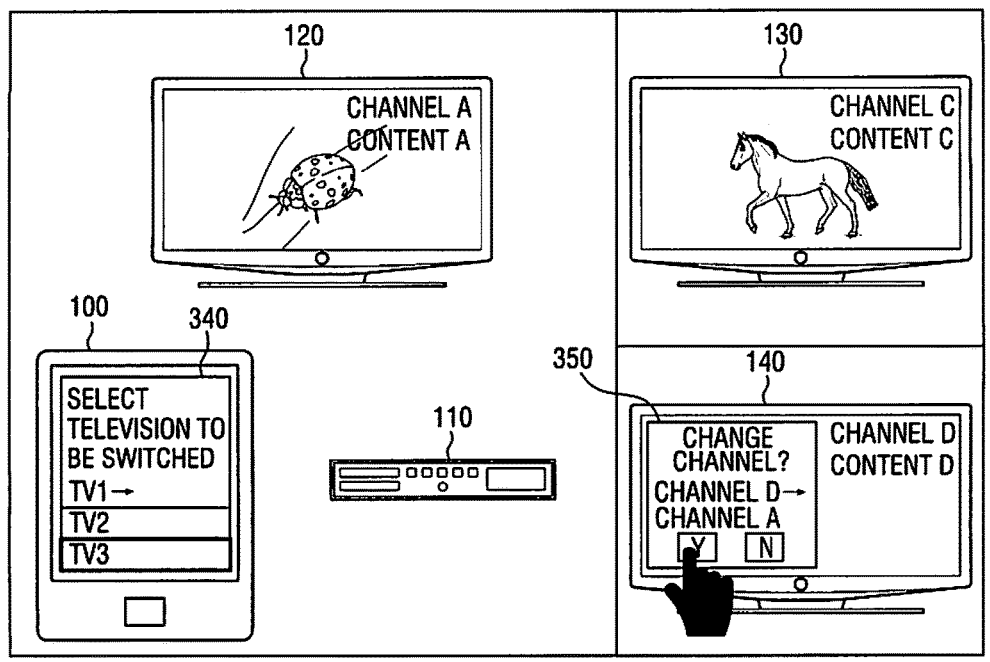

As illustrated in FIG. 3F, if the third TV 140 (that is, TV 3) is selected as a television to be switched by a user, a channel switch confirming message 350 is displayed on the screen of the third TV 140 as illustrated in FIG. 3G.

Figure 3H:
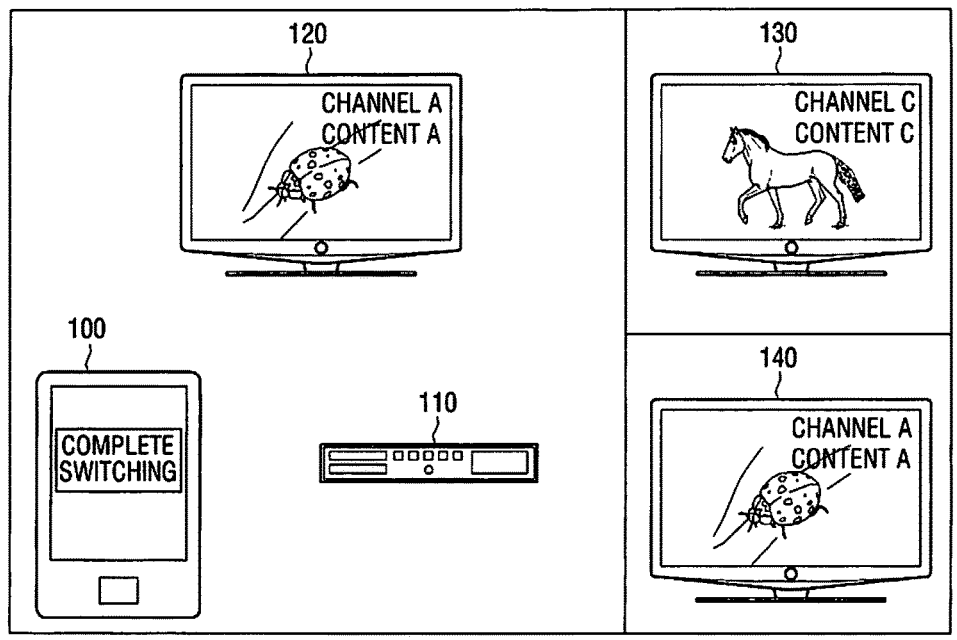

If 'Yes' is selected in the channel switch confirming message 350, a channel of the third TV 140 is switched with a channel A which is being reproduced in the first TV 120 which is the nearest television, as illustrated in FIG. 3H.

Figure 3I:
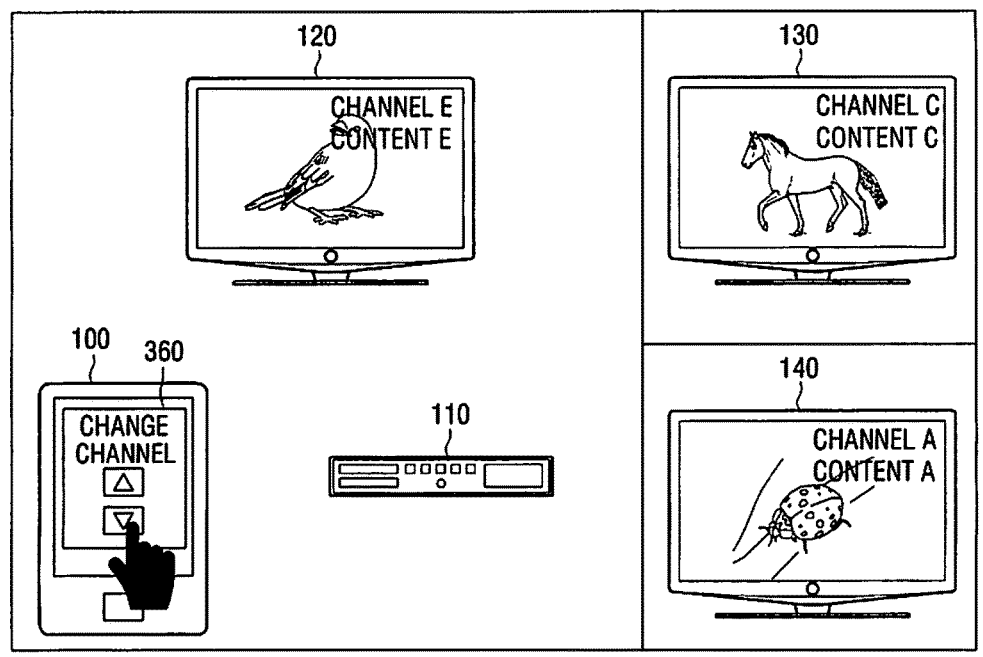

Subsequently, as illustrated in FIG. 3I, if a channel switch command is input through a channel switch window 360, a channel of the first TV 120 which is the nearest television is changed. It can be seen that a channel of the first TV 120 is changed to channel E and content is also changed to content E in FIG. 3I.

Through the above process, a television to be switched reproduces content of the nearest television. Accordingly, a user may reproduce content being reproduced in the nearest television in another television and watch other content using the nearest television.

In the embodiment of the present invention, a video system is a set-top box and a plurality of televisions, but the video system may include various video apparatuses. For example, the video system may include a Blu-ray player, a DVD player, a monitor, and a home theater.

In the embodiment of the present invention, a display apparatus is a television, but this is only an example. The display apparatus may be not only a television but also a monitor, a PMP, a mobile display.

In the embodiment of the present invention, a video system consists of a set-top box and a plurality of televisions, but this is only an example. The video system may consist of only a plurality of televisions. Specifically, in the embodiment of the present invention, a plurality of televisions may be directly controlled by a user apparatus without a set-top box.

Although several embodiments of the present invention have been shown and described, it would be appreciated by those skilled in the art that changes may be made in these embodiments without departing from the principles and spirit of the invention, the scope of which is defined in the appended claims.

What is claimed is:

1. A method for controlling content reproduction in a user apparatus, the method comprising:
    displaying a content;
    in response to a user command being input, detecting a distance between each of a plurality of display apparatuses and the user apparatus based on an intensity of a signal received from each of the plurality of display apparatuses;
    identifying a display apparatus which is closest to the user apparatus among the plurality of display apparatuses, based on the detected distances; and
    in response to identifying the closest display apparatus, transmitting information regarding the content being displayed in the user apparatus and control information for reproducing the content to the identified closest display apparatus.

2. The method of claim 1, wherein the user apparatus is communicably connected to the plurality of display apparatuses through a video apparatus.

3. The method of claim 2, wherein transmitting the information regarding the content being displayed in the user apparatus and the control information for reproducing the content comprises:
    generating a transmission command to transmit the information regarding the content being displayed in the user apparatus and the control information for reproducing the content to the display apparatus; and
    transmitting the transmission command and information regarding the display apparatus to the video apparatus.

4. The method of claim 3, further comprising controlling, through the video apparatus, the display apparatus to reproduce the content being displayed in the user apparatus using the information regarding content being displayed in the user apparatus, the control information for reproducing the content, and the information regarding the display apparatus according to the transmission command.

5. The method of claim 4, wherein transmitting the information regarding the content being displayed in the user apparatus and the control information for reproducing the content further comprises
    transmitting, through the video apparatus, the content being displayed in the user apparatus to the display apparatus and the control information for reproducing the content using the information regarding the content being displayed in the user apparatus and the information regarding the display apparatus.

6. The method of claim 4, wherein controlling the display apparatus to reproduce the content being displayed in the user apparatus comprises controlling, through the video apparatus, the display apparatus to change a broadcast channel of the display apparatus to a broadcast channel of the user apparatus using the information regarding the content being displayed in the user apparatus, the control information for reproducing the content, and the information regarding the display apparatus.

7. The method of claim 1, further comprising receiving a specific input is entered by a user, commanding the user apparatus to detect the distance to each of the plurality of display apparatuses.

8. The method of claim 1, further comprising controlling the display apparatus to reproduce the content being displayed in the user apparatus using the information regarding the content being displayed in the user apparatus and the control information for reproducing the content.

9. A video system, comprising:
    a user apparatus configured to display a content; and
    a plurality of display apparatuses,
    wherein the user apparatus is configured to, in response to a user command being input, detect a distance between each of the plurality of display apparatuses and the user apparatus based on an intensity of a signal received from each of the plurality of display apparatuses, identify a display apparatus which is closest to the user apparatus among the plurality of display apparatuses, based on the detected distances, and in response to identifying the closest display apparatus, transmits information regarding the content being displayed in the user apparatus and the control information for reproducing the content to the identified closest display apparatus.

10. The video system of claim 9, further comprising a video apparatus communicably connected to the user apparatus and the plurality of display apparatuses.

11. The video system of claim 10, wherein the user apparatus generates a transmission command to transmit the information regarding the content being displayed in the user apparatus and the control information for reproducing the content to the display apparatus and transmits, to the video apparatus, the transmission command, the information regarding the content being displayed in the user apparatus, the control information for reproducing the content, and information regarding the display apparatus.

12. The video system of claim 11, wherein the video apparatus controls the display apparatus to reproduce the content being displayed in the user apparatus using the information regarding the content being displayed in the user apparatus, the control information for reproducing the content, and the information regarding the display apparatus according to the transmission command.

13. The video system of claim 12, wherein the video apparatus transmits the content being displayed in the user apparatus to the display apparatus using the information regarding the content being displayed in the user apparatus, the control information for reproducing the content, and the information regarding the display apparatus.

14. The video system of claim 12, wherein the video apparatus changes a broadcast channel of the display apparatus to a broadcast channel of the user apparatus using the information regarding the content being displayed in the user apparatus, the control information for reproducing the content, and the information regarding the display apparatus.

* * * * *